United States Patent
Toko et al.

(10) Patent No.: US 11,906,854 B2
(45) Date of Patent: Feb. 20, 2024

(54) LIQUID CRYSTAL ELEMENT, LIGHTING APPARATUS

(71) Applicant: STANLEY ELECTRIC CO., LTD., Tokyo (JP)

(72) Inventors: Yasuo Toko, Tokyo (JP); Hiroshi Tozuka, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 162 days.

(21) Appl. No.: 17/623,121

(22) PCT Filed: Jun. 15, 2020

(86) PCT No.: PCT/JP2020/023374
§ 371 (c)(1),
(2) Date: Dec. 27, 2021

(87) PCT Pub. No.: WO2020/262066
PCT Pub. Date: Dec. 30, 2020

(65) Prior Publication Data
US 2022/0229334 A1 Jul. 21, 2022

(30) Foreign Application Priority Data
Jun. 28, 2019 (JP) ................................. 2019-121990

(51) Int. Cl.
*G02F 1/1343* (2006.01)
*F21S 41/64* (2018.01)

(52) U.S. Cl.
CPC ...... *G02F 1/134309* (2013.01); *F21S 41/645* (2018.01)

(58) Field of Classification Search
CPC .......................... G02F 1/134309; F21S 41/645
See application file for complete search history.

(56) References Cited

U.S. PATENT DOCUMENTS

| 6,226,057 B1 | 5/2001 | Lee |
| 10,408,409 B2 | 9/2019 | Ohno |

(Continued)

FOREIGN PATENT DOCUMENTS

| EP | 3401591 A1 | 11/2018 |
| JP | H06160875 A | 6/1994 |

(Continued)

OTHER PUBLICATIONS

Extended European Search Report (EESR) dated Dec. 23, 2022, issued in counterpart European Application No. 20833071.2.

(Continued)

*Primary Examiner* — Joseph L Williams
(74) *Attorney, Agent, or Firm* — Holtz, Holtz & Volek PC

(57) ABSTRACT

A liquid crystal element includes a first substrate, a second substrate arranged to face the first substrate, a first pixel electrode corresponding to a first pixel region arranged on the first substrate on the second substrate side, a second pixel electrode corresponding to a second pixel region arranged on the first substrate on the second substrate side, a common electrode arranged on the first substrate side of the second substrate, and a liquid crystal layer arranged between a group of the first and second pixel electrodes and the common electrode, where the first pixel electrode and the second pixel electrode are provided on different layers on the first substrate, and their ends are arranged so as to partially overlap each other in a plan view.

12 Claims, 13 Drawing Sheets

(56) References Cited

U.S. PATENT DOCUMENTS

2009/0059152 A1    3/2009  Kamada et al.
2018/0328561 A1   11/2018  Ohno
2019/0063712 A1    2/2019  Toko et al.

FOREIGN PATENT DOCUMENTS

| JP | H1144893   A | 2/1999 |
| JP | 2005183327 A | 7/2005 |
| JP | 2009063696 A | 3/2009 |
| JP | 2019040727 A | 3/2019 |

OTHER PUBLICATIONS

International Search Report (ISR) (and English translation thereof) dated Aug. 4, 2020, issued in International Application No. PCT/JP2020/023374.
Written Opinion dated Aug. 4, 2020, issued in International Application No. PCT/JP2020/023374.

| GRADATION | MEASUREMENT POINT A | | MEASUREMENT POINT B | |
|---|---|---|---|---|
| | TRANSMITTANCE (%) | VOLTAGE [V] | TRANSMITTANCE (%) | VOLTAGE [V] |
| 0 | 0.02 | 0 | 0.02 | 0 |
| 1 | 4.30 | 3 | 4.05 | 4 |
| 2 | 8.29 | 3.2 | 8.75 | 4.4 |
| 3 | 12.78 | 3.4 | 11.36 | 4.6 |
| 4 | 17.18 | 3.6 | 16.54 | 5 |
| 5 | 20.96 | 3.8 | 20.49 | 5.4 |
| 6 | 23.88 | 4 | 23.92 | 5.8 |
| 7 | 27.73 | 4.4 | 28.27 | 6.6 |
| 8 | 31.94 | 7.6 | 32.01 | 11 |

| GRADATION | MEASUREMENT POINT A | | MEASUREMENT POINT B | |
|---|---|---|---|---|
| | TRANSMITTANCE (%) | VOLTAGE [V] | TRANSMITTANCE (%) | VOLTAGE [V] |
| 0 | 0.02 | 0 | 0.02 | 0 |
| 1 | 3.34 | 3 | 4.19 | 4 |
| 2 | 7.10 | 3.2 | 9.19 | 4.4 |
| 3 | 11.53 | 3.4 | 11.91 | 4.6 |
| 4 | 15.98 | 3.6 | 17.16 | 5 |
| 5 | 19.85 | 3.8 | 21.04 | 5.4 |
| 6 | 22.89 | 4 | 24.30 | 5.8 |
| 7 | 27.04 | 4.4 | 28.35 | 6.6 |
| 8 | 32.50 | 7.6 | 32.47 | 11 |

| GRADATION | MEASUREMENT POINT A | | MEASUREMENT POINT B | |
|---|---|---|---|---|
| | TRANSMITTANCE (%) | VOLTAGE [V] | TRANSMITTANCE (%) | VOLTAGE [V] |
| 0 | 0.02 | 0 | 0.03 | 0 |
| 1 | 2.88 | 3 | 4.30 | 4 |
| 2 | 6.41 | 3.2 | 9.40 | 4.4 |
| 3 | 10.66 | 3.4 | 12.10 | 4.6 |
| 4 | 14.95 | 3.6 | 17.22 | 5 |
| 5 | 18.69 | 3.8 | 20.87 | 5.4 |
| 6 | 21.66 | 4 | 23.95 | 5.8 |
| 7 | 25.79 | 4.4 | 27.71 | 6.6 |
| 8 | 32.10 | 7.6 | 32.11 | 11 |

| GRADATION | MEASUREMENT POINT A | | MEASUREMENT POINT B | |
|---|---|---|---|---|
| | TRANSMITTANCE (%) | VOLTAGE [V] | TRANSMITTANCE (%) | VOLTAGE [V] |
| 0 | 0.28 | 0 | 0.35 | 0 |
| 1 | 6.97 | 3 | 7.95 | 4 |
| 2 | 9.71 | 3.2 | 11.64 | 4.4 |
| 3 | 12.08 | 3.4 | 13.24 | 4.6 |
| 4 | 14.13 | 3.6 | 15.92 | 5 |
| 5 | 15.86 | 3.8 | 17.86 | 5.4 |
| 6 | 17.28 | 4 | 19.55 | 5.8 |
| 7 | 19.61 | 4.4 | 22.21 | 6.6 |
| 8 | 26.20 | 7.6 | 28.27 | 11 |

US 11,906,854 B2

LIQUID CRYSTAL ELEMENT, LIGHTING APPARATUS

TECHNICAL FIELD

The present invention relates to a device (system) for irradiating light in a desired pattern in front of a vehicle, for example, and a liquid crystal element suitable for use in the device (system).

BACKGROUND ART

Japanese Unexamined Patent Application Publication No. 2005-183327 (Patent Document 1) discloses a vehicle headlight including at least a light emitting unit composed of at least one LED and an optical shielding unit which cuts off a part of the light irradiated toward the front from the light emitting unit and forms a cutoff suitable for the light distribution pattern of the vehicle headlight, where the optical shielding unit is comprised of an electro-optical element equipped with light control function and a control unit which controls lighting of the electro-optical element, and is configured to change shape of the light distribution pattern by selectively controlling the light control portion, by the electric switching control of the electro-optical element by the control unit. As the electro-optical element, a liquid crystal element is used, for example.

In the vehicle headlight as described above, the electro-optical element such as a liquid crystal element is configured to have a plurality of pixel electrodes in order to realize selective light control. These pixel electrodes are separated from each other so that a voltage can be applied individually, and a gap is provided between each of the pixels for electrical insulation. At this time, the gap between the pixel electrodes is, for example, about 10 μm depending on the formation accuracy. Further, when three or more rows of pixel electrodes are arranged, it is necessary to pass a wiring portion between the pixel electrodes for applying a voltage to each pixel electrode in the intermediate row, thereby the gap between the pixel electrodes becomes larger. The gap between the pixel electrodes are portions that do not contribute to image formation, and cause dark lines to be generated in the light distribution pattern. Ina vehicle headlight, since an image formed by an electro-optical element (an image corresponding to a light distribution pattern) is magnified by a lens or the like and projected to the front of the vehicle, the above-described dark lines are also magnified and become easier to visually recognize, thereby, there is an inconvenience that the appearance of the light distribution pattern is worsened. To cope with this, narrowing the gap between the pixel electrodes can be considered as a solution, but in this case, since it causes an increase in manufacturing cost and may cause a problem such as a short circuit between the pixel electrodes, such a solution is not preferable. Further, narrowing the width of the wiring portion to be disposed between the pixel electrodes can be considered as a solution, but in this case, since the resistance value of the wiring portion increases and it makes it difficult to apply necessary and sufficient voltage to the pixel electrodes, and since the probability of disconnection due to width narrowing also increases, such a solution is not preferable. Here, it should be noted that such inconveniences are not limited to a vehicle headlight, and the same can be said in a general lighting apparatus that controls the light distribution pattern using a liquid crystal element or the like.

PRIOR ART DOCUMENT

Patent Document

Patent Document 1: Japanese Unexamined Patent Application Publication No. 2005-183327

SUMMARY OF THE INVENTION

In a specific aspect, it is an object of the present invention to provide a technique capable of improving the appearance of a light distribution pattern in a lighting apparatus that controls the light distribution pattern using a liquid crystal element or the like.

[1] A liquid crystal element according to one aspect of the present invention is a liquid crystal element having (a) a first substrate, (b) a second substrate arranged to face the first substrate, (c) a first pixel electrode corresponding to a first pixel region arranged on the surface of the first substrate on the second substrate side, (d) a second pixel electrode corresponding to a second pixel region arranged on the surface of the first substrate on the second substrate side, (e) a common electrode arranged on the first substrate side of the second substrate, and (f) a liquid crystal layer arranged between a group of the first pixel electrode and the second pixel electrode and the common electrode, (g) where the first pixel electrode and the second pixel electrode are provided on different layers on the first substrate, and their ends are arranged so as to partially overlap each other in a plan view.

[2] A lighting apparatus according to one aspect of the present invention is (a) a lighting apparatus capable of variably setting a light distribution pattern including (b) a light source, (c) a liquid crystal element which uses light from the light source to form an image corresponding to the light distribution pattern, (d) an optical system which projects the image formed by the liquid crystal element, and (e) where, as the liquid crystal element, the liquid crystal element described above is used.

According to the above configuration, in a lighting apparatus which controls a light distribution pattern using a liquid crystal element or the like, it is possible to improve the appearance of the light distribution pattern.

MODE FOR CARRYING OUT THE INVENTION

Figure 1:
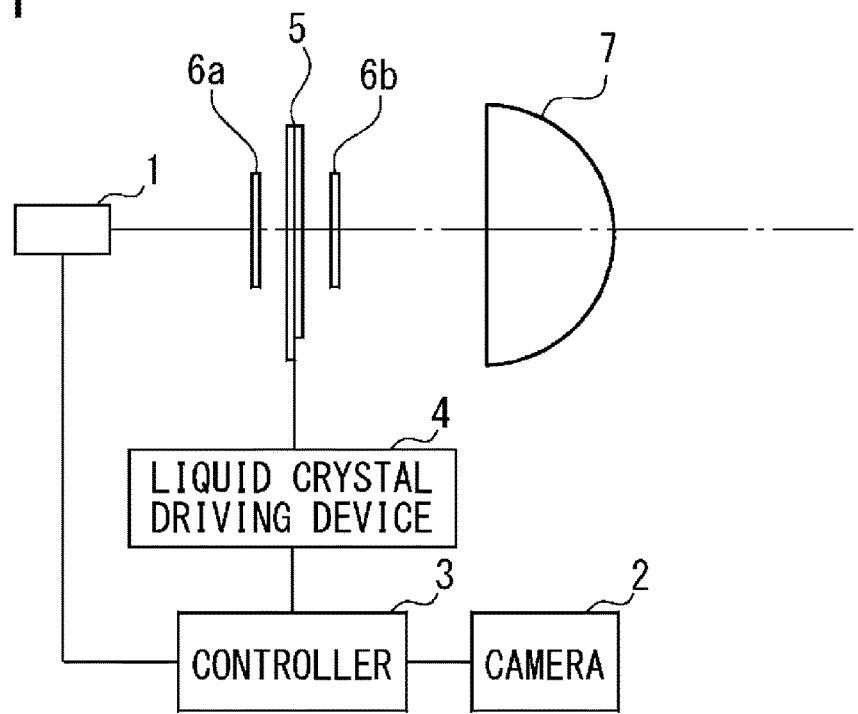
FIG. 1 is a diagram showing the configuration of a vehicle headlight system of one embodiment.

FIG. 1 is a diagram showing the configuration of a vehicle headlight system of one embodiment. The vehicle headlight system shown in FIG. 1 is configured to include a light source 1, a camera 2, a controller 3, a liquid crystal driving device 4, a liquid crystal element 5, a pair of polarizers 6a and 6b, and a projection lens 7. This vehicle headlight system detects the positions of a vehicle in front, pedestrians, etc. that exist around the own vehicle based on the images taken by the camera 2, sets a certain region including the position of the vehicle in front or the like as a non-irradiation region (dimming region), and sets the other region as the light irradiation region and performs selective light irradiation.

The light source 1 is configured to include a white LED configured by combining a light emitting diode (LED) that emits blue light with a yellow phosphor, for example. The light source 1 is provided with a plurality of white LEDs arranged in a matrix or a line, for example. Here, as the light source 1, in addition to the LEDs, a laser, or alight source generally used for a vehicle headlight unit such as a light bulb or a discharge lamp can be used. The turn-on and turn-off state of the light source 1 is controlled by the controller 3. The light emitted from the light source 1 enters the liquid crystal element (liquid crystal panel) 5 via the polarizer 6a. Here, another optical system (for example, a lens, a reflecting mirror, or a combination thereof) may exist on the path from the light source 1 to the liquid crystal element 5.

The camera 2 captures the front of the own vehicle and outputs the image (information), and is arranged at a predetermined position (for example, the upper part inside the windshield) in the own vehicle. Here, if the vehicle is equipped with a camera for other purposes (for example, an automatic braking system, etc.), the camera may be shared.

The controller 3 detects the position of the vehicle in front or the like by performing image processing based on the image obtained by the camera 2 that captures the front of the own vehicle, sets a light distribution pattern in which the detected position of the vehicle in front or the like is set as the non-irradiation region and the other region is set as the light irradiation region, and generates a control signal for forming an image corresponding to this light distribution pattern to be supplied to the liquid crystal driving device 4. The controller 3 is realized by executing a predetermined operation program in a computer system having, for example, a CPU, a ROM, a RAM, or the like.

The liquid crystal driving device 4 individually controls the alignment state of the liquid crystal layer in each pixel region of the liquid crystal element 5 by supplying a drive voltage to the liquid crystal element 5 based on a control signal supplied from the controller 3.

The liquid crystal element 5 has, for example, a plurality of pixel regions (optical modulation regions) that can be individually controlled, and the transmittance of each pixel region is variably set according to the magnitude of the voltage applied to the liquid crystal layer provide by the liquid crystal driving device 4. By irradiating the liquid crystal element 5 with the light from the light source 1, an image having a contrast corresponding to the above-described light irradiation region and non-irradiation region is formed. For example, the liquid crystal element 5 is provided with a vertically aligned liquid crystal layer, arranged between a pair of polarizers 6a and 6b in a crossed Nicol arrangement, the light transmittance becomes extremely low (light-shielding state) when no voltage (or a voltage below a threshold value) is applied to the liquid crystal layer, and the light transmittance becomes relatively high (transmission state) when a voltage is applied to the liquid crystal layer.

The pair of polarizers 6a and 6b have their polarization axes substantially orthogonal to each other, for example, and are arranged so as to face each other with the liquid crystal element 5 interposed therebetween. In the present embodiment, a normally black mode which is an operation mode in which light is shielded (transmittance becomes extremely low) when no voltage is applied to the liquid crystal layer is assumed. As the polarizers 6a and 6b, for example, an absorption type polarizer made of a general organic material (iodine-based or dye-based) can be used. Further, when heat resistance is desired, it is preferable to use a wire grid type polarizer. A wire grid type polarizer is a polarizer formed by arranging ultrafine wires made of metal such as aluminum. Further, an absorption type polarizer and a wire grid type polarizer may be used in combination.

The projection lens 7 spreads an image (an image having a contrast corresponding to the light irradiation region and the non-irradiation region) formed by the light transmitting through the liquid crystal element 5 in order to suit light distribution for headlights and projects it in front of the own vehicle, and an appropriately designed lens is used. In this embodiment, an inverted projection type projector lens is used.

Figure 2:
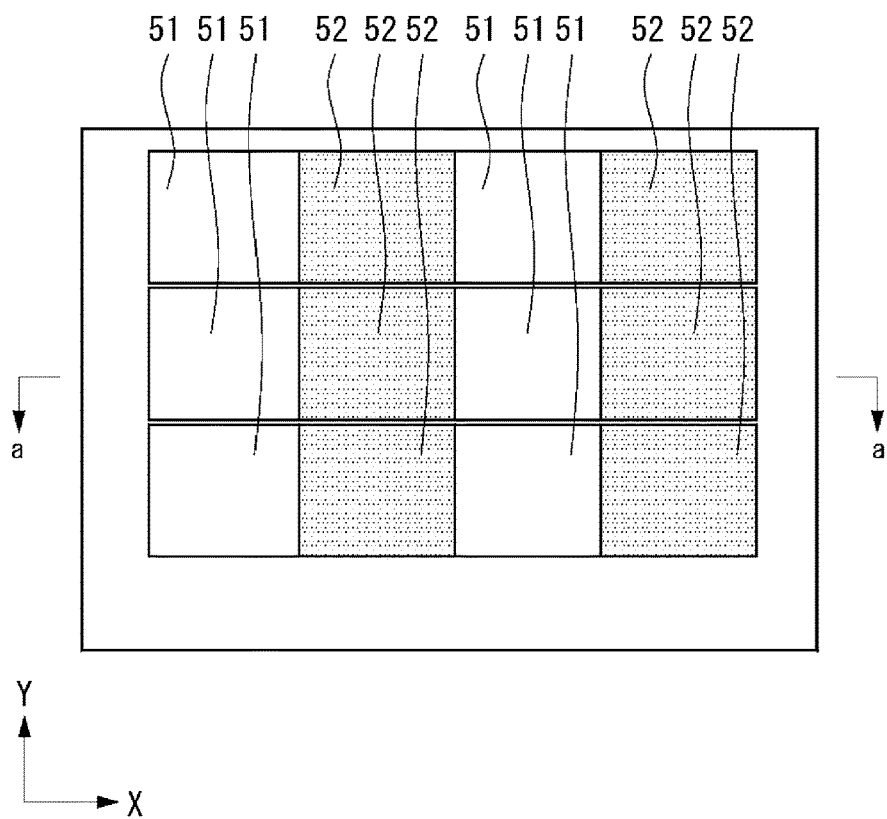
FIG. 2 is a plan view for explaining the configuration of the liquid crystal element.
Figure 3:
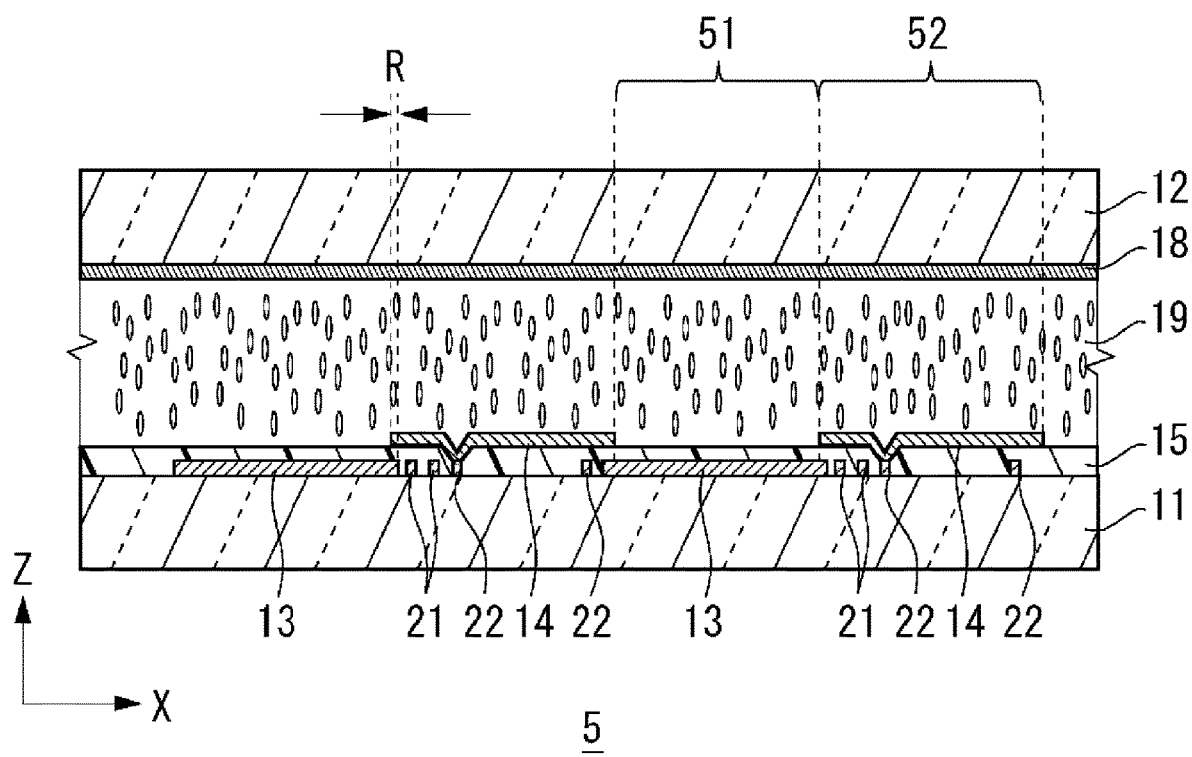
FIG. 3 is a cross sectional view showing the configuration of the liquid crystal element.

FIG. 2 is a plan view for explaining the configuration of the liquid crystal element 5. FIG. 3 is a cross sectional view showing the configuration of the liquid crystal element 5. Here, the cross sectional view shown in FIG. 3 corresponds to the cross section taken along the line a-a shown in FIG. 2 and FIG. 4 which is to be described later. As shown in each figure, the liquid crystal element 5 is configured to include a plurality of first pixel regions (first pixel portion) 51 and a plurality of second pixel regions (second pixel portion) 52. Here, in FIG. 2, each second pixel region 52 is shown with a pattern so that each first pixel region 51 and each second pixel region 52 can be easily distinguished. Here, the left-right direction of the liquid crystal element corresponds to the left-right direction of the light distribution projected in front of the own vehicle.

Each first pixel region 51 and each second pixel region 52 are, for example, rectangular in a plan view as shown in FIG. 2. Further, each of the first pixel regions 51 and each of the second pixel regions 52 are connected to the liquid crystal driving device 4, and is statically driven, for example, and the light transmittance can be individually controlled. As shown in FIG. 3, each first pixel region 51 applies a voltage to the liquid crystal layer 19 by each first pixel electrode (first individual electrode) 13 provided on a first substrate 11 side and a common electrode 18 provided on a second substrate 12 side, and by changing the alignment direction of the liquid crystal molecules in the liquid crystal layer 19 by the voltage, the transmittance of the light transmitting through each electrode is changed. Each second pixel region 52 applies a voltage to the liquid crystal layer 19 by each second pixel electrode (second individual electrode) 14 provided on the first substrate 11 side and a common electrode 18 provided on the second substrate 12 side, and by changing the alignment direction of the liquid crystal molecules in the liquid crystal layer 19 by the voltage, the transmittance of the light transmitting through each electrode is changed.

As shown in FIG. 2, in a plan view, in the X direction in the figure, each first pixel region 51 and each second pixel region 52 are arranged to have the ends of each region in contact with each other so that no gap is formed therebetween. Further, each first pixel region 51 and each second pixel region 52 are alternately arranged one by one along the X direction in the figure. Further, in the Y direction in the figure, each first pixel region 51 and each second pixel region 52 are arranged with a gap (for example, a few μm).

As shown in FIG. 3, the liquid crystal element 5 is configured to include a first substrate 11 and a second substrate 12 arranged to face each other, a plurality of first pixel electrodes 13 provided on the first substrate 11, a plurality of second pixel electrodes 14, an insulating film 15, a plurality of first wiring portions 21 and a plurality of second wiring portions 22, a common electrode 18 provided on the second substrate 12, and a liquid crystal layer 19 arranged between the first substrate 11 and the second substrate 12. Here, although not shown for convenience of explanation, the first substrate 11 and the second substrate 12 are appropriately provided with an alignment film in order to regulate the alignment state of the liquid crystal layer 19.

The first substrate 11 and the second substrate 12 are each a rectangular substrate in a plan view, and are arranged so as to face each other. As each substrate, for example, a transparent substrate such as a glass substrate or a plastic substrate can be used. A plurality of spherical spacers made of resin are dispersedly arranged between the first substrate 11 and the second substrate 12 for example, and the spacers keep the substrate gap at a desired distance (for example, approximately a few μm). Here, columnar spacers made of resin may be used instead of the spherical spacers.

Each first pixel electrode 13 is provided on one surface side of the first substrate 11. Further, each first wiring portion 21 is provided on one surface side of the first substrate 11. Further, each second wiring portion 22 is provided between each first pixel electrodes 13 on one surface side of the first substrate 11. Each first pixel electrode 13, each first wiring portion 21, and each second wiring portion 22 are configured by appropriately patterning a transparent conductive film such as indium tin oxide (ITO). The above-described first pixel region 51 is demarcated at each of the overlapping regions of the first pixel electrode 13 and the common electrode 18.

Each second pixel electrode 14 is provided on the upper side of the insulating layer 15 on one surface side of the first substrate 11. That is, each first pixel electrode 13 is arranged closer to the first substrate 11 than each second pixel electrode 14. Each second pixel electrode 14 is configured by appropriately patterning a transparent conductive film such as indium tin oxide (ITO). The above-described second pixel region 52 is demarcated at each of the overlapping regions of the second pixel electrode 14 and the common electrode 18.

Each first pixel electrode 13 and each second pixel electrode 14 are alternately arranged one by one in the X direction in the figure, and the ends of adjacent electrodes in the X direction are provided to slightly overlap each other in the Z direction in the figure. The overlapping region R, which is the region where the ends of the adjacent first pixel electrodes 13 and the second pixel electrodes 14 partially overlap, has a width of approximately a few μm to 15 μm, for example. By providing such an overlapping region R, positional deviation tolerance during manufacture can be increased, and the gap between the first pixel region 51 and the second pixel region 52 (the gap in the X direction in FIG. 2) can be reliably eliminated.

Each first wiring portion 21 is connected to one of the first pixel electrodes 13 to apply a voltage to the first pixel electrode 13 (refer to FIG. 4 to be described later). Each second wiring portion 22 is connected to one of the second pixel electrode 14 via the first insulating film 15 in order to apply a voltage to the second pixel electrode 14, and is arranged at a position where it overlaps with at least a part of one of the second pixel electrode 14 in a plan view.

The insulating film 15 has translucency, and is provided on one surface side of the first substrate 11 so as to cover the upper side of each first pixel electrode 13. This insulating film 15 is, for example, an oxide film or a nitride film such as a $SiO_2$ film or a SiON film, and can be formed by a vapor phase process such as a sputtering method or a solution process. Here, as the insulating film 15, an organic insulating film may be used. The thickness of the insulating film 15 is preferably about 0.4 μm to 1.5 μm, for example. Further, the dielectric constant of the insulating film 15 is preferred to be a high value, for example, 4 or more, and further preferably, 8 or more.

The common electrode 18 is provided on one surface side of the second substrate 12. This common electrode 18 is provided so as to overlap all first pixel electrodes 13 and all second pixel electrodes 14 in a plan view. The common electrode 18 is configured by appropriately patterning a transparent conductive film such as indium tin oxide (ITO), for example.

The liquid crystal layer 19 is interposed between the first substrate 11 and the second substrate 12. In the present embodiment, the liquid crystal layer 19 is configured by using a nematic liquid crystal material having a negative dielectric anisotropy Δε and having fluidity. The liquid crystal layer 19 of the present embodiment is set so that the alignment direction of the liquid crystal molecules when no voltage is applied is substantially vertically aligned.

Here, as described above, alignment films are provided on one surface side of the first substrate 11 and one surface side of the second substrate 12, respectively. As each alignment film, a vertical alignment film that regulates the alignment state of the liquid crystal layer 19 to vertically align is used. Each alignment film is subjected to a uniaxial alignment treatment such as a rubbing treatment, and has a uniaxial alignment regulating force that regulates the alignment of the liquid crystal molecules of the liquid crystal layer 19 in that direction. The directions of the alignment treatment for each alignment film are set to be staggered (anti-parallel), for example.

Figure 4A:
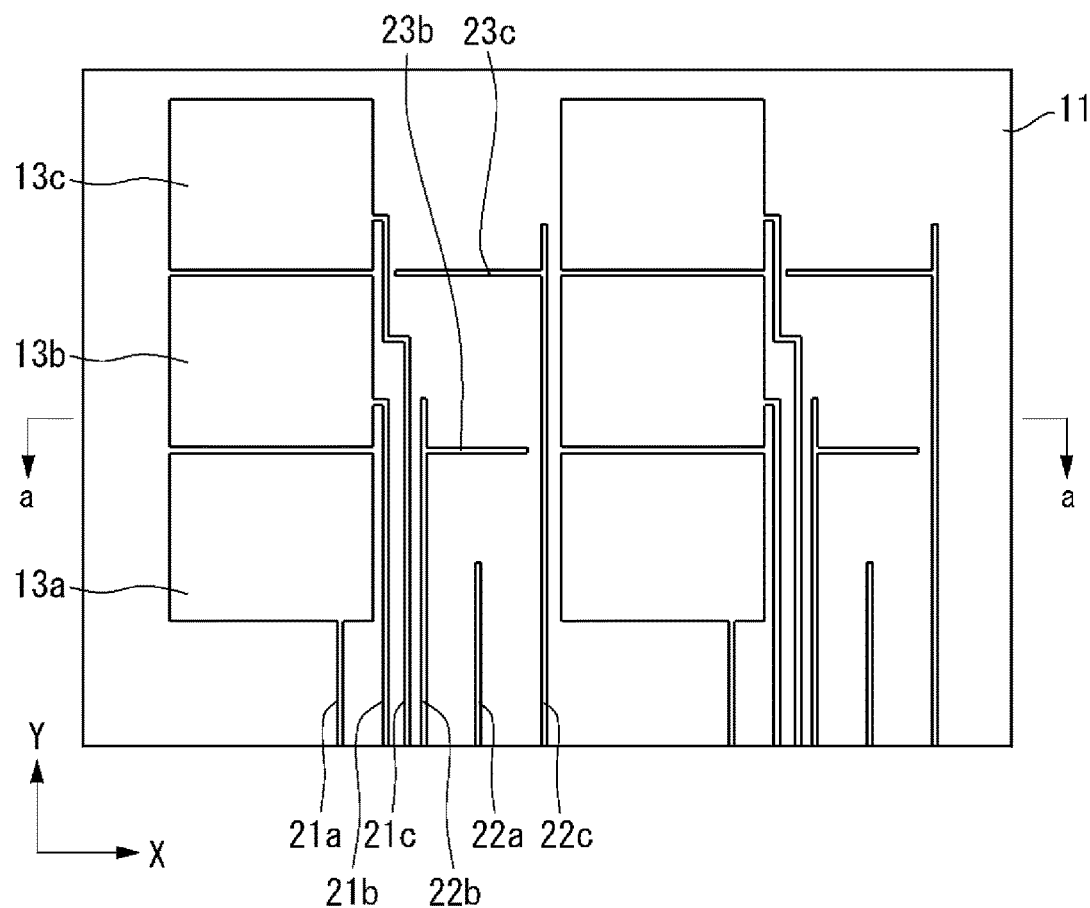
FIG. 4A is a plan view for explaining the configurations of the first pixel electrode, the first wiring portion, and the second wiring portion.
Figure 4B:
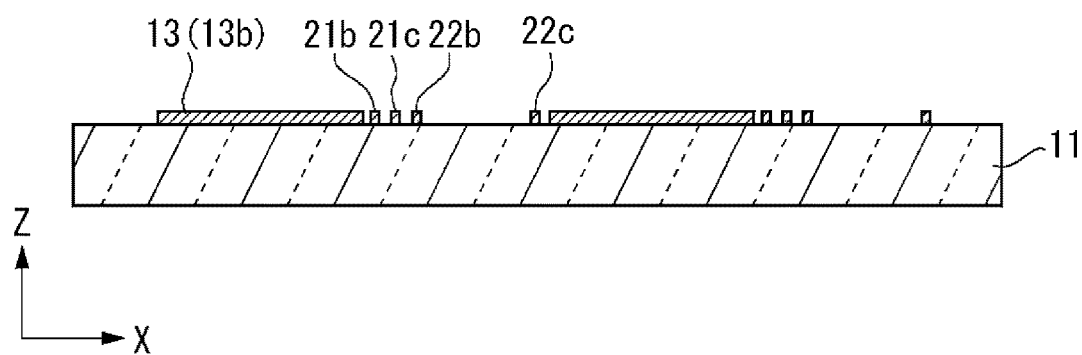
FIG. 4B is a cross sectional view for explaining the configuration of the first pixel electrode, the first wiring portion, and the second wiring portion.

FIG. 4A is a plan view for explaining the configurations of the first pixel electrode, the first wiring portion, and the second wiring portion. Further, FIG. 4B is a cross sectional view for explaining the configurations of the first pixel electrode, the first wiring portion, and the second wiring portion. As shown in FIG. 4A, on one surface side of the first substrate 11, each first pixel electrode 13 is provided in a region corresponding to each first pixel region 51. In the figure, reference numerals 13a, 13b, and 13c are used in order to distinguish each of the first pixel electrodes 13. Further, in the figure, reference numerals 21a, 21b, and 21c are used in order to distinguish each of the first wiring portions 21, and reference numerals 22a, 22b, and 22c are used in order to distinguish each of the second wiring portions 22.

A first pixel electrode 13a arranged in the lower part of the figure corresponds to one first pixel region 51. A first wiring portion 21a is connected to the first pixel electrode 13a. The first wiring portion 21a extends from the lower end of the first pixel electrode 13a to the lower end of the first substrate 11. A first pixel electrode 13b arranged in the middle part of the figure corresponds to one first pixel region 51. A first wiring portion 21b is connected to the first pixel electrode 13b. In the figure, the first wiring portion 21b extends through the right side of each of the first pixel electrode 13b and the first pixel electrode 13a to the lower end of the first substrate 11. A first pixel electrode 13c arranged in the upper part of the figure corresponds to one first pixel region 51. A first wiring portion 21c is connected to the first pixel electrode 13c. In the figure, the first wiring portion 21c extends through the right side of each of the first pixel electrode 13b, the first pixel electrode 13a, and the first wiring portion 21b, to the lower end of the first substrate 11.

In the figure, second wiring portions 22a, 22b, and 22c are arranged on the right side of the first pixel electrodes 13a, 13b, and 13c and the first wiring portions 21a, 21b, and 21c. In detail, the second wiring portion 22a is provided between the other second wiring portions 22b and 22c. The second wiring portion 22a is associated with a second pixel electrode 14a to be described later, and has a shorter length in the Y direction than the other second wiring portions 22b and 22c. The second wiring portion 22b is provided between the first wiring portion 21c and the second wiring portion 22a. The second wiring portion 22b is associated with a second pixel electrode 14b to be described later, and has a shorter length in the Y direction than the wiring portion 22c. The second wiring portion 22c is provided on the right side of the second wiring portion 22a. The second wiring portion 22c is associated with a second pixel electrode 14c to be described later, and has a longer length in the Y direction than the other wiring portions 22a and 22b.

In the figure, an inter-pixel electrode 23b extending in the X direction is connected to the second wiring portion 22b. The inter-pixel electrode 23b is provided so as to overlap with the gap (see FIG. 2) provided between adjacent second pixel regions 52 in the Y direction. Similarly, in the figure, an inter-pixel electrode 23c extending in the X direction is connected to the second wiring portion 22c. This inter-pixel electrode 23c is provided so as to overlap with the gap (see FIG. 2) provided between adjacent second pixel regions 52 in the Y direction. When a voltage is applied to the second pixel electrodes 14b and 14c which are connected to the second wiring portions 22b and 22c, these inter-pixel electrodes 23b and 23c become the same potential as the second pixel electrodes 14b and 14c. Therefore, when a voltage is applied to the second pixel electrodes 14b and 14c, the alignment direction of the liquid crystal molecules of the liquid crystal layer 19 can be changed even at the gap between the adjacent second pixel regions 52 in the Y direction, thereby allowing to prevent or alleviate generation of dark lines corresponding to the gap.

Figure 5A:
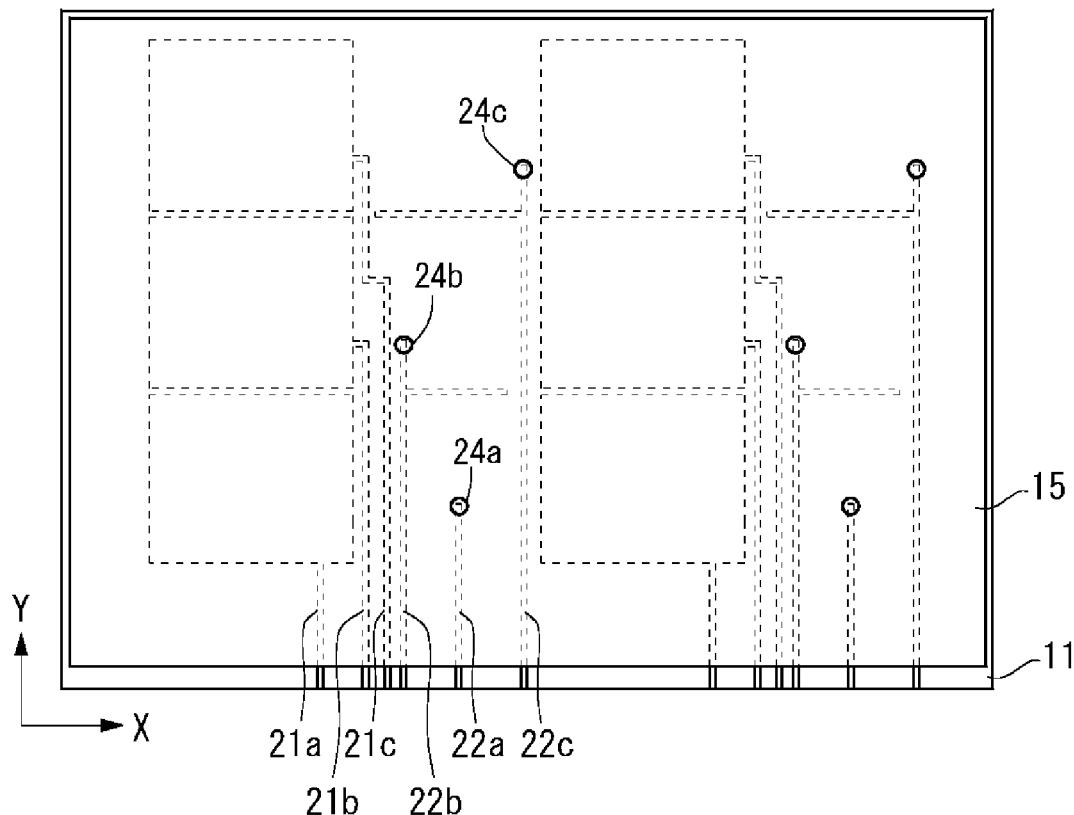
FIG. 5A is a plan view for explaining the configuration of the insulating film.
Figure 5B:
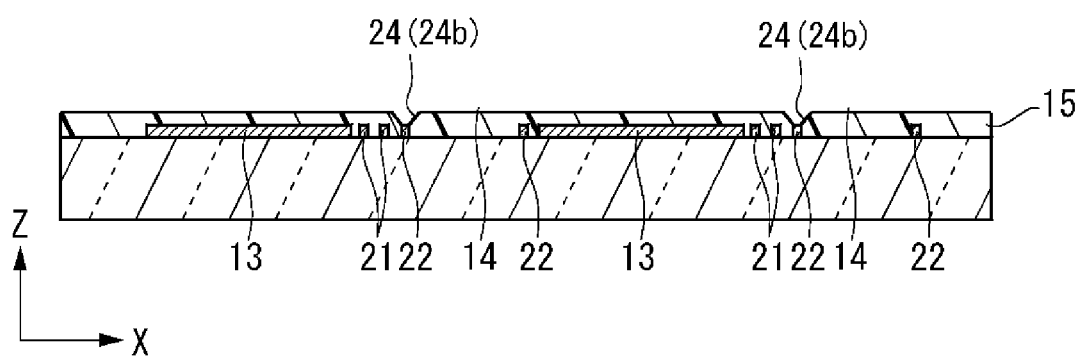
FIG. 5B is a cross sectional view for explaining the configuration of the insulating film.

FIG. 5A is a plan view for explaining the configuration of the insulating film. FIG. 5B is a cross sectional view for explaining the configuration of the insulating film. As shown in each figure, the insulating film 15 is provided on one surface side of the first substrate 11 so as to cover each first pixel electrode 13, each first wiring portion 21, and each second wiring portion 22. Further, this insulating film 15 is provided with openings (through holes) 24a, 24b, and 24c for exposing a part of each of the second wiring portions 22a, 22b, and 22c. Through these openings 24a, 24b, and 24c, each of the second wiring portions 22a, 22b, and 22c and each of the second pixel electrodes 14a, 14b, and 14c (refer to FIG. 6A) are physically and electrically connected to each other.

Figure 6A:
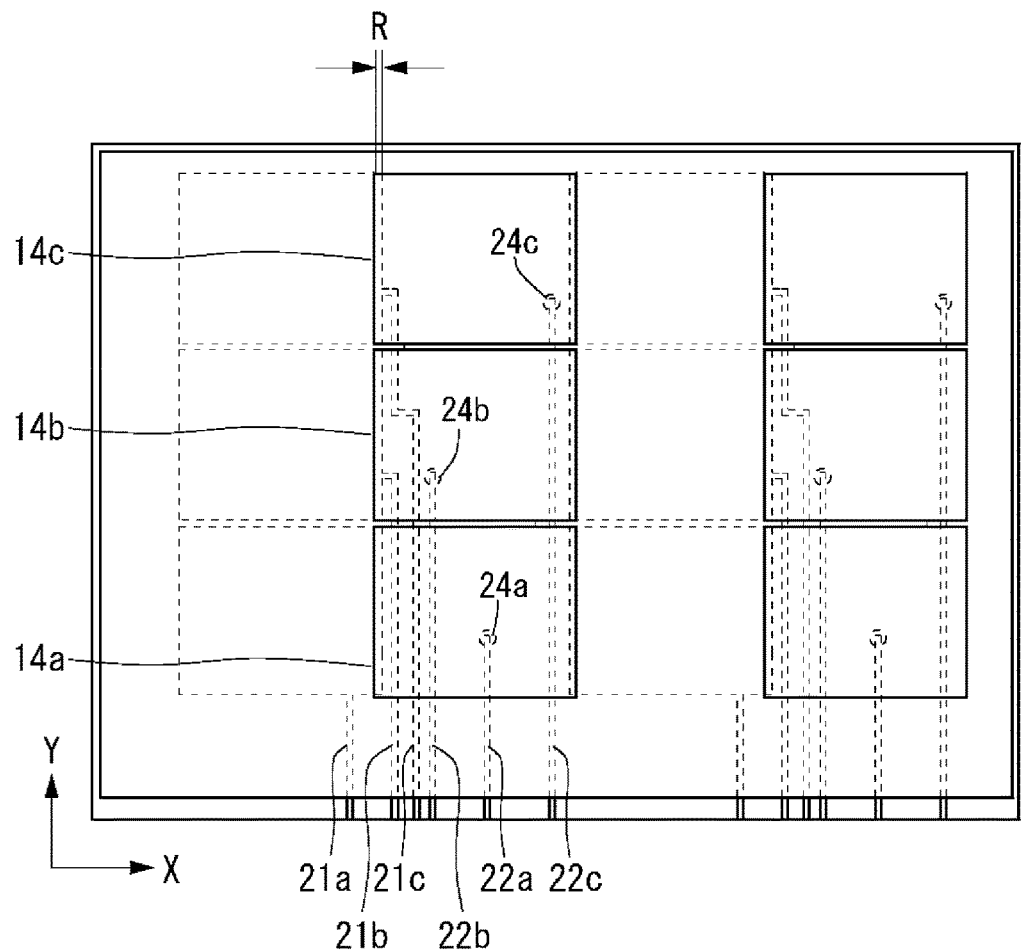
FIG. 6A is a plan view for explaining the configuration of the second pixel electrode.
Figure 6B:
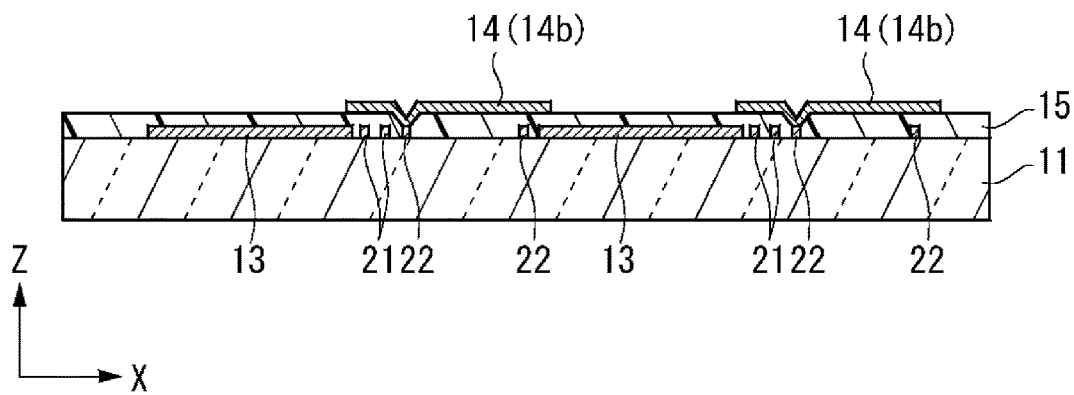
FIG. 6B is a cross sectional view for explaining the configuration of the second pixel electrode.

FIG. 6A is a plan view for explaining the configuration of the second pixel electrode. FIG. 6B is a cross sectional view for explaining the configuration of the second pixel electrode. As shown in each figure, on one surface side of the insulating film 15 of the first substrate 11, each second pixel electrode 14 is provided in a region corresponding to each second pixel region 52. In the figure, reference numerals 14a, 14b, and 14c are used in order to distinguish each of the second pixel electrodes 14. A second pixel electrode 14a is physically and electrically connected to the second wiring portion 22a on the lower layer side via the opening 24a of the insulating film 15. A second pixel electrode 14b is physically and electrically connected to the second wiring portion 22b on the lower layer side via the opening 24b of the insulating film 15. A second pixel electrode 14c is physically and electrically connected to the second wiring portion 22c on the lower layer side via the opening 24c of the insulating film 15. Further, as described above, each of the second pixel electrodes 14a, 14b, and 14c is respectively arranged so as to have an overlapping region R between each of the first pixel electrodes 13a, 13b, and 13c.

Further, the second pixel electrodes 14a, 14b, and 14c are provided so as to overlap the first wiring portions 21b and 21c and the second wiring portions 22a, 22b, and 22c in a plan view. In this way, since the wiring portions can be arranged on the lower layer side of the pixel electrode, it is not necessary to secure a space for arranging the wiring portion outside each pixel region. Thereby, the gap between each pixel electrode can be eliminated.

Figure 7:
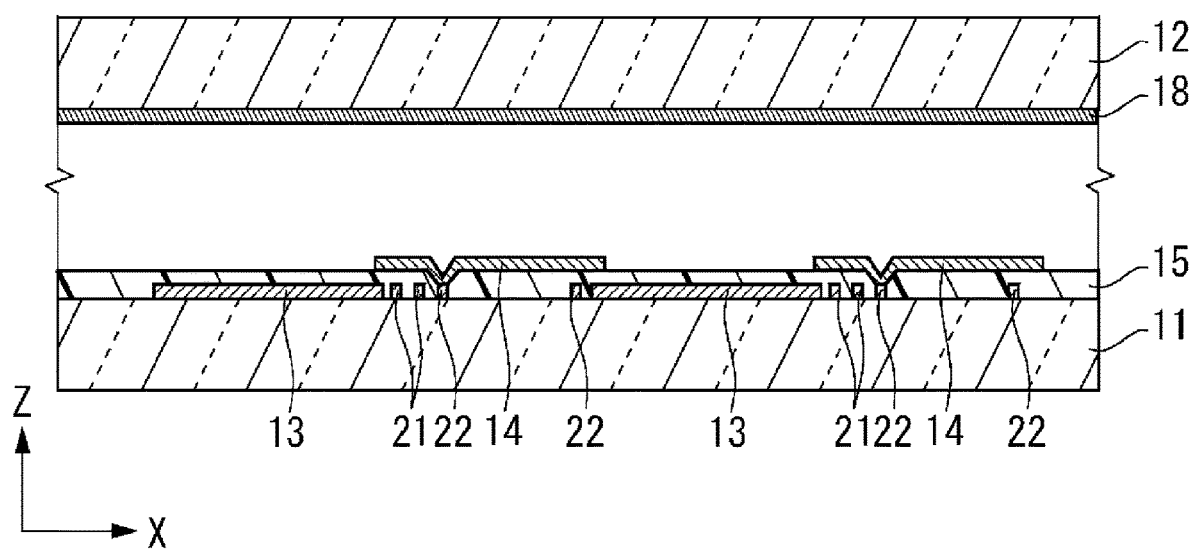
FIG. 7 is a cross sectional view for explaining a state in which the first substrate and the second substrate are overlapped.

FIG. 7 is a cross sectional view for explaining a state in which the first substrate and the second substrate are overlapped. Here, a method for manufacturing the liquid crystal element of the present embodiment will be briefly described. First, as shown in FIG. 4A and FIG. 4B, each first pixel electrodes 13 and the like are formed on one surface side of the first substrate 11. Next, as shown in FIG. 5A and FIG. 5B, the insulating film 15 is formed on one surface side of the first substrate 11 so as to cover each first pixel electrode 13 and the like, and the openings 24a, etc. are further formed. Further, as shown in FIG. 6A and FIG. 6B, each second pixel electrode 14 is formed on the upper side of the insulating film 15. On the other hand, the common electrode 18 is formed on one surface side of the second substrate 12. Alignment treatment is appropriately performed to one surface side of each of the first substrate 11 and the second substrate 12 thus obtained, and both substrates are arranged to overlap each other. By injecting a liquid crystal material between the first substrate 11 and the second substrate 12, the liquid crystal layer 19 is formed. From the above, the liquid crystal element of the present embodiment can be obtained (refer to FIG. 3). The first wiring portion, the second wiring portion, and the common electrode of the liquid crystal element 5 are electrically connected to the liquid crystal driving device 4, and are configured so that the liquid crystal driving device 4 can supply a driving voltage to the liquid crystal element 5 based on a control signal supplied from the controller 3.

Figure 8A:
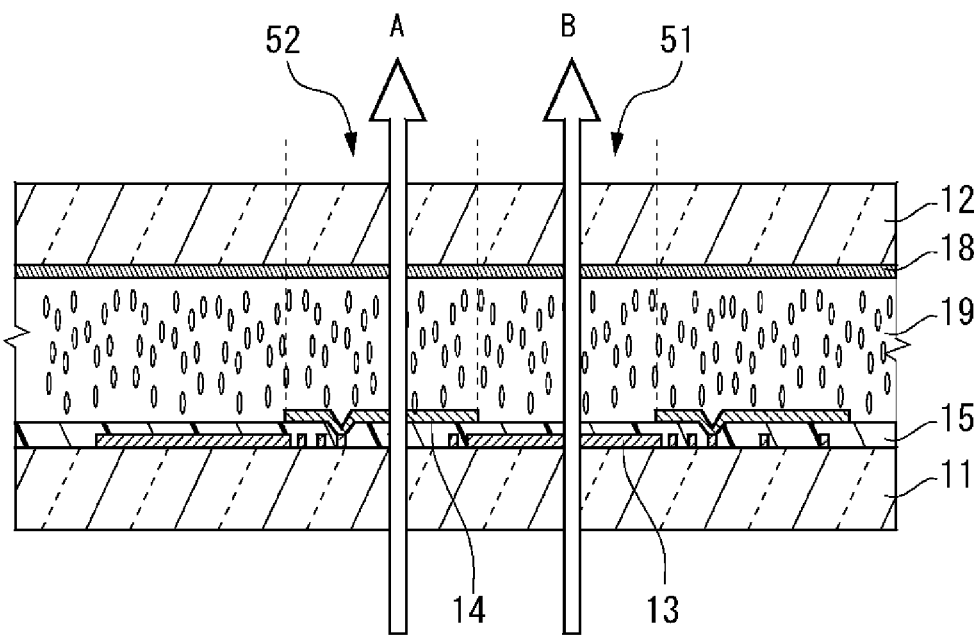
FIG. 8A and FIG. 8B are diagrams for explaining the electro-optical characteristics (VT characteristics) of the first pixel region and the second pixel region.
Figure 8B:
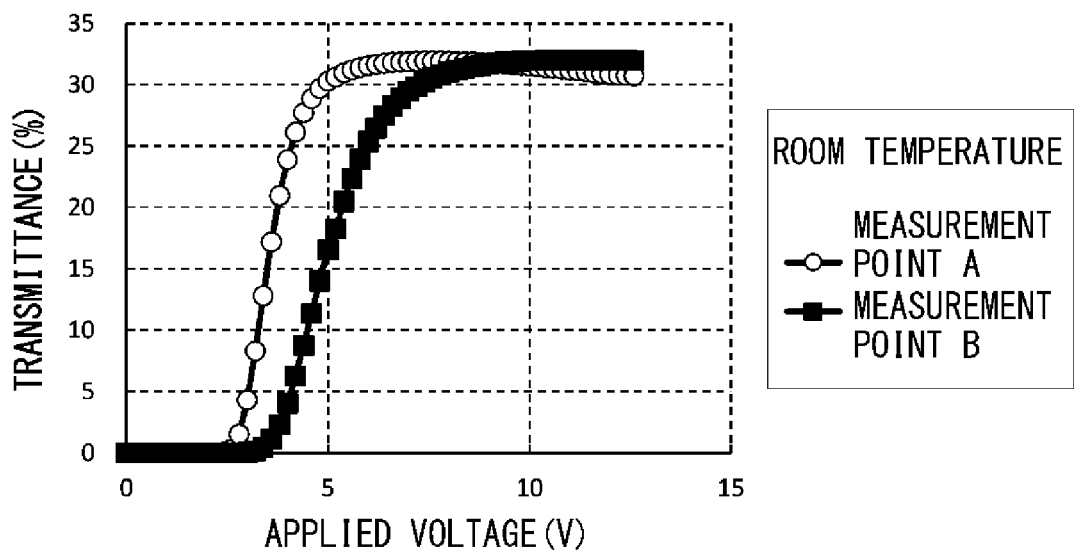

FIG. 8A and FIG. 8B are diagrams for explaining the electro-optical characteristics (VT characteristics) of the first pixel region and the second pixel region. As shown in FIG. 8A, the measurement point which passes through the first pixel region 51 is defined as B, the measurement point which passes through the second pixel region 52 is defined as A, and an example of measuring the electro-optical characteristics at each measurement point A and B at room temperature (25° C.) is shown in FIG. 8B. Comparing the first pixel region 51 and the second pixel region 52, in the first pixel region 51, the voltage from the first pixel electrode 13 is divided by the insulating film 15 and then applied to the liquid crystal layer 19, whereas in the second pixel region 52, the voltage from the second pixel electrode 14 is directly applied to the liquid crystal layer 19. Depending on the presence or absence of the divided voltage, there is a difference in electro-optical characteristics between the first pixel region 51 and the second pixel region 52. Therefore, in order to obtain the same transmittance in the first pixel region 51 and the second pixel region 52 in the gradation display region (for example, between an applied voltage of about 3 to 8 V), the voltage applied to the first pixel region 51 (measurement point B) is set to a value relatively larger than the voltage applied to the second pixel region 52 (measurement point A), in correspondence with the value equivalent to the voltage divided by the insulating film 15.

Specifically, assuming that the capacitance of the insulating layer 15 is $C_{in}$, the capacitance of the liquid crystal layer 19 is $C_{LC}$, the voltage applied to the first pixel electrode 13 is $V_{down}$, and the voltage applied to the second pixel electrode 14 is $V_{up}$, then the relationship between these values can be expressed as follows.

$$V_{down}=(C_{in}/(C_{in}+C_{LC}))*V_{up}$$

Here, assuming that the electrode area is S, the dielectric constant of the insulating layer 15 is $\varepsilon_{in}$, the film thickness of the insulating layer 15 is $d_{in}$, the dielectric constant of the liquid crystal layer 19 is $\varepsilon_{LC}$, and the film thickness of the liquid crystal layer 19 is $d_{LC}$, then $C_{in}$ and $C_{LC}$ can be expressed as follows.

$$C_{in}=(S/d_{in})*\varepsilon_{in}$$

$$C_{LC}=(S/d_{LC})*\varepsilon_{LC}$$

Therefore, theoretically, if the applied voltages to the first pixel electrode 13 and the second pixel electrode 14 are set so as to satisfy the above relational expressions, the difference in electro-optical characteristics between the first pixel region 51 and the second pixel region 52 is eliminated, and unevenness in the brightness of the irradiation light can be suppressed.

Figures 9A, 9B:
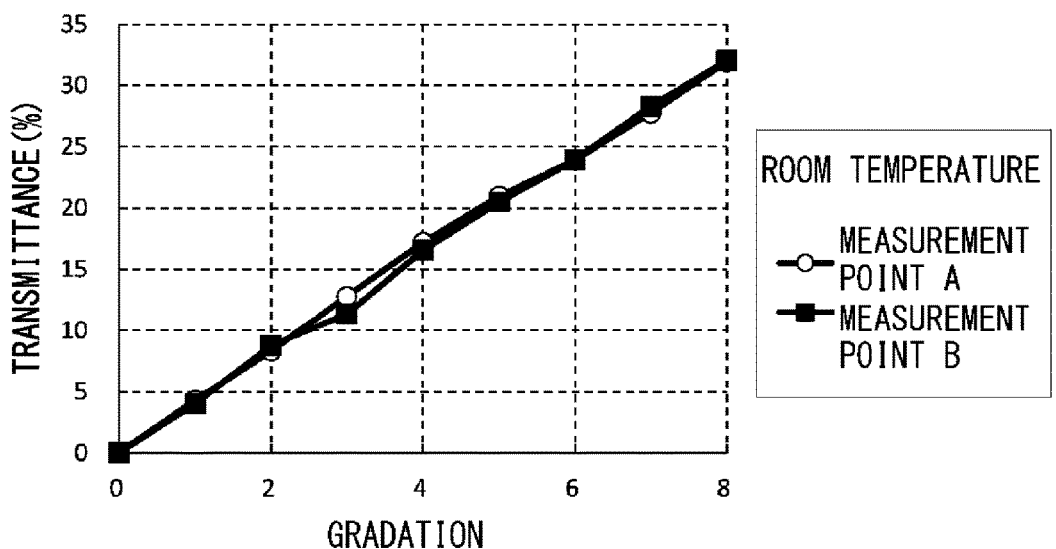
FIG. 9A is a chart showing an example of setting a voltage to be applied to the first pixel electrode and the second pixel electrode at room temperature.
FIG. 9B is a graph showing the relationship between the transmittance and the gradation shown in FIG. 9A.

FIG. 9A is a chart showing an example of setting the voltage applied to the first pixel electrode and the second pixel electrode at room temperature. Further, FIG. 9B is a graph showing the relationship between the transmittance and the gradation shown in FIG. 9A. Here, in the liquid crystal element according to the above embodiment, a liquid crystal element in which the layer thickness of the liquid crystal layer 19 being 4 μm and the refractive index anisotropy Δn being about 0.13 is used (the same applies hereinafter). In FIG. 9A, in a case where the gradation is divided into 9 stages, the chart shows the applied voltage at which a desired transmittance can be obtained. It can be seen that the required voltages are different between measurement point A and measurement point B. For example, when obtaining the transmittance of gradation "5", 3.8V is applied to the second pixel electrode 14 corresponding to measurement point A, and 5.4V is applied to the first pixel electrode 13 corresponding to measurement point B. Same applies to other gradations. In this way, by setting the voltage applied to the first pixel electrode 13 and the second pixel electrode 14 with a difference, the difference in electro-optical characteristics between the first pixel region 51 and the second pixel region 52 is reduced, and unevenness in the brightness of the irradiation light can be suppressed. In the illustrated example, in the range from gradation "0" to gradation "8", the difference in transmittance at each of the measurement points A and B is within ±1.5%, and it can be said that the transmittances are substantially the same. Further, except for gradation "3", the difference in transmittance is within ±1.0%, and it can be said that the transmittances are substantially the same. In the case of forming high-intensity irradiation light in front of the vehicle as in the present embodiment, if the difference in transmittance is within ±2.0%, it can be said that the transmittances are substantially the same.

Figure 10A:
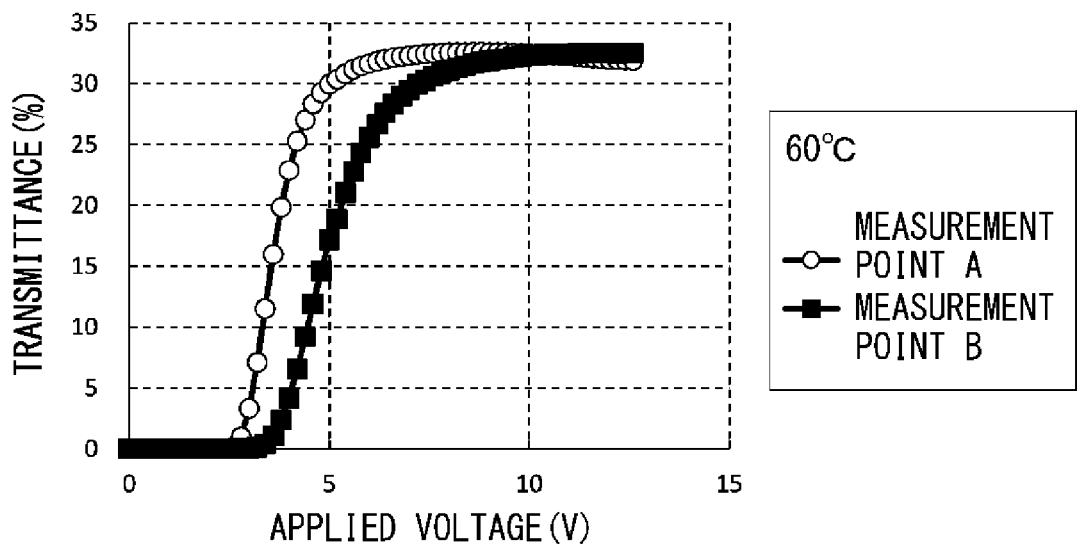
FIG. 10A is a graph for explaining the electro-optical characteristics (VT characteristics) of the first pixel region and the second pixel region at an atmospheric temperature of 60° C.
Figure 10B:
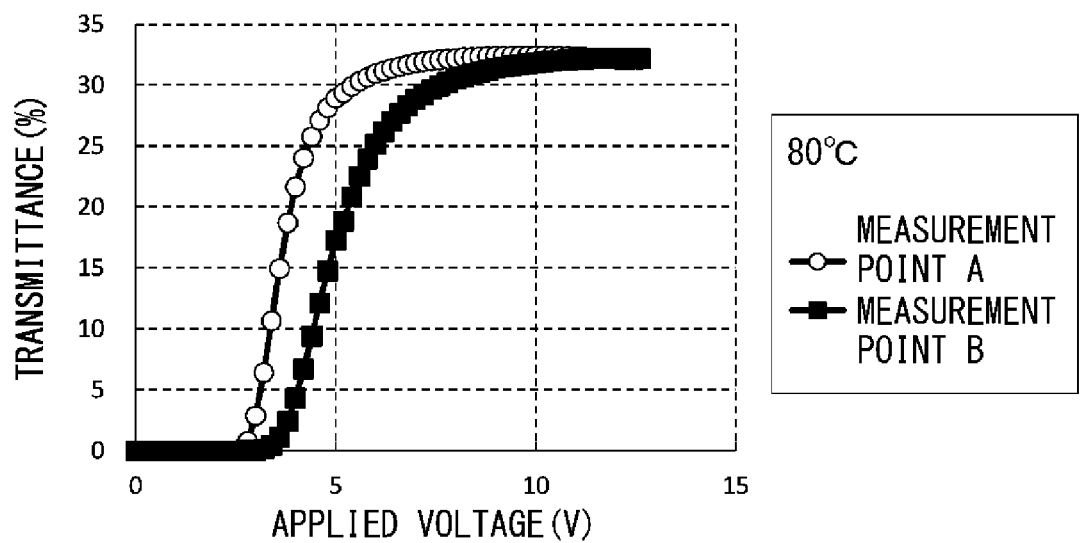
FIG. 10B is a graph for explaining the electro-optical characteristics (VT characteristics) of the first pixel region and the second pixel region at an atmospheric temperature of 80° C.

FIG. 10A is a graph for explaining the electro-optical characteristics (VT characteristics) of the first pixel region and the second pixel region at an atmospheric temperature of 60° C. Further, FIG. 10B is a graph for explaining the electro-optical characteristics (VT characteristics) of the first pixel region and the second pixel region at an atmospheric temperature of 80° C. As in the case of room temperature described above, it can be seen that there is a difference in electro-optical characteristics between the first pixel region (measurement point B) and the second pixel region 52 (measurement point A) even in a high temperature atmosphere.

Figures 11A, 11B:
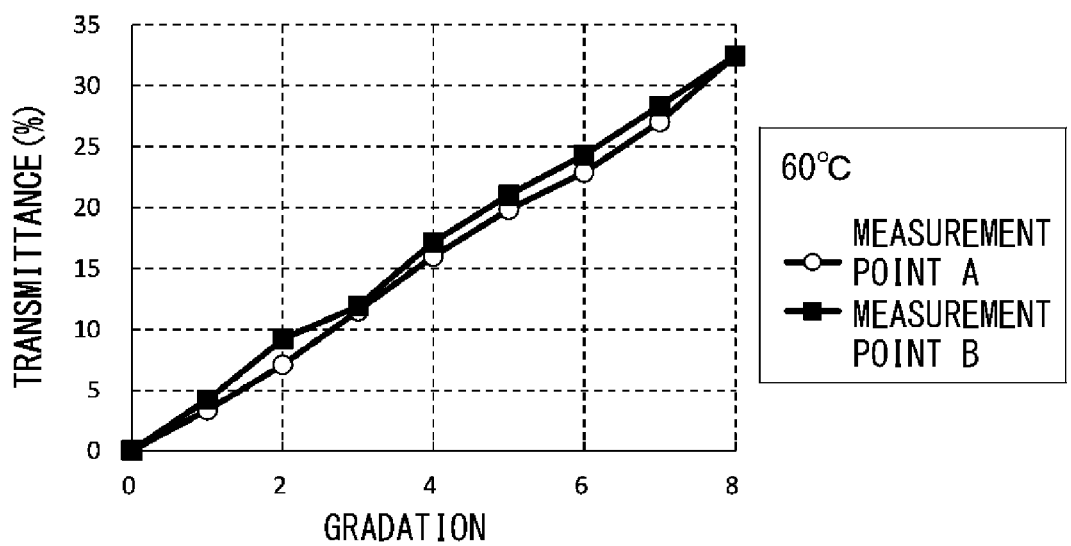
FIG. 11A is a chart showing an example of setting the voltage to be applied to the first pixel electrode and the second pixel electrode at an atmospheric temperature of 60° C.
FIG. 11B is a graph showing the relationship between the transmittance and the gradation shown in FIG. 11A.
Figures 12A, 12B:
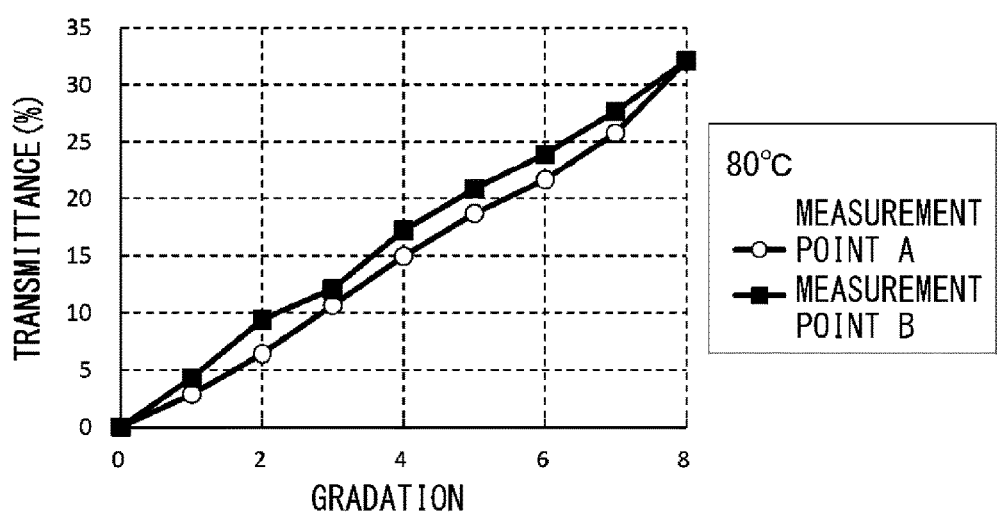
FIG. 12A is a chart showing an example of setting the voltage applied to the first pixel electrode and the second pixel electrode at an atmospheric temperature of 80° C.
FIG. 12B is a graph showing the relationship between the transmittance and the gradation shown in FIG. 12A.

FIG. 11A is a chart showing an example of setting the voltage applied to the first pixel electrode and the second pixel electrode at an atmospheric temperature of 60° C. Further, FIG. 11B is a graph showing the relationship between the transmittance and the gradation shown in FIG. 11A. FIG. 12A is a chart showing an example of setting the voltage applied to the first pixel electrode and the second pixel electrode at an atmospheric temperature of 80° C. Further, FIG. 12B is a graph showing the relationship between the transmittance and the gradation shown in FIG. 12A. As in the case of room temperature described above, by setting the voltage applied to the first pixel electrode 13 and the second pixel electrode 14 with a difference, the difference in electro-optical characteristics between the first pixel region 51 and the second pixel region 52 is reduced, and unevenness in the brightness of the irradiation light can be suppressed.

Figure 13A:
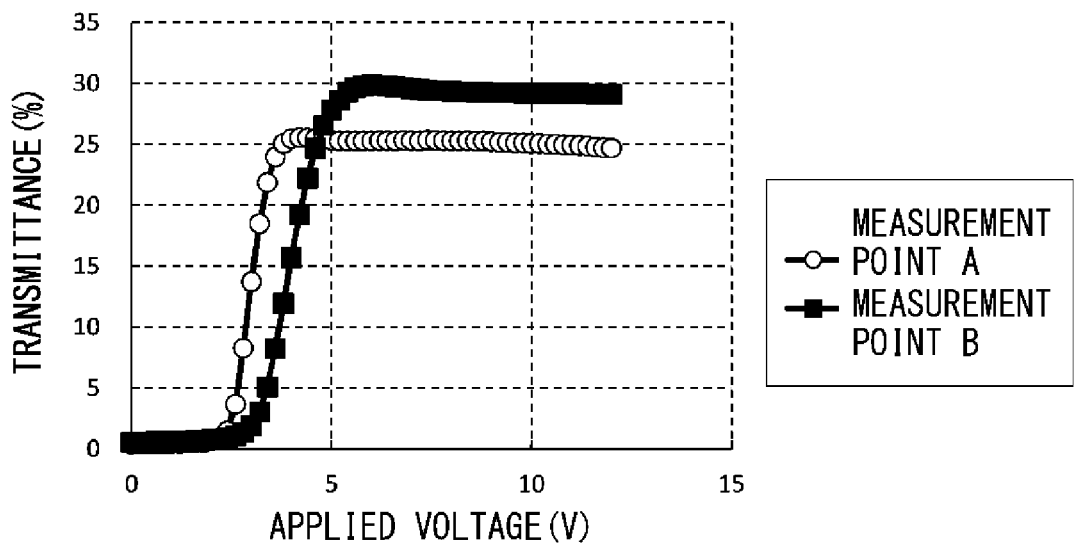
FIG. 13A and FIG. 13B are graphs showing measurement examples of electro-optical characteristics with respect to obliquely incident light at room temperature.
Figure 13B:
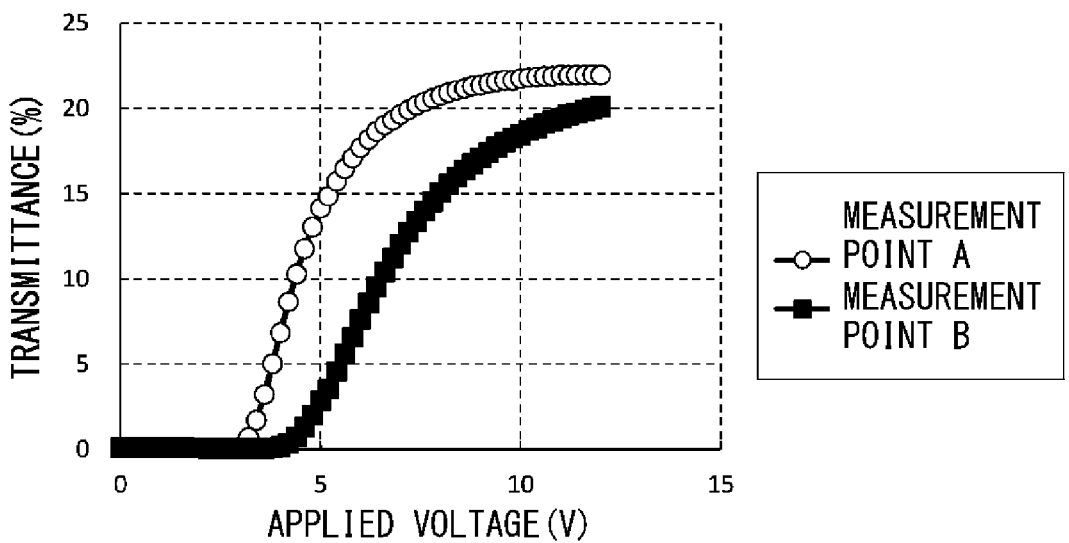
Figures 14A, 14B:
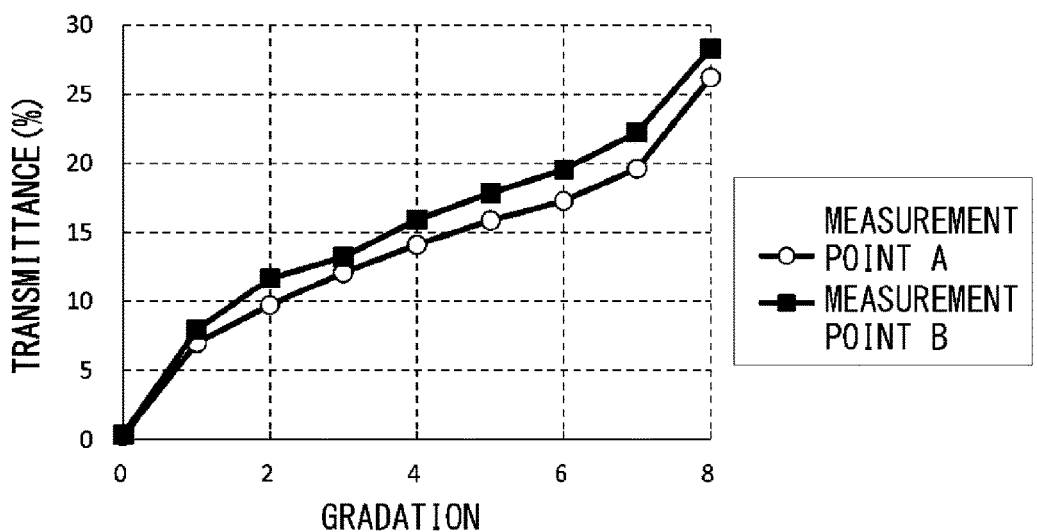
FIG. 14A is a chart showing the sum of the transmittances in the viewing direction and the reverse viewing direction of the voltage at each gradation shown in FIG. 9A described above.
FIG. 14B is a graph showing the relationship between the transmittance and the gradation shown in FIG. 14A.

FIG. 13A and FIG. 13B are graphs showing measurement examples of electro-optical characteristics with respect to obliquely incident light at room temperature. FIG. 13A shows the electro-optical characteristics when light is incident from 20° direction with respect to the substrate normal in a viewing direction, and FIG. 13B shows the electro-optical characteristics when light is incident from 20° direction with respect to the substrate normal in a reverse viewing direction. Further, FIG. 14A is a chart showing the sum of the transmittances in the viewing direction and the reverse viewing direction of the voltage at each gradation shown in FIG. 9A described above. FIG. 14B is a graph showing the relationship between the transmittance and the gradation shown in FIG. 14A. From these results, it can be seen that, by applying the same gradation voltage as when visually recognizing from the front direction at room temperature, light can be irradiated with the same brightness at both the measurement points A and B even when the viewing angle direction changes. It can also be seen that, although the linearity of the gradation is slightly lost, the gradation is not inverted. Here, it can be seen that the same gradation voltage as the voltage optimized for the normal direction can be used even in the direction of the strictest viewing angle.

According to the above embodiment, in a plan view, since it is possible to eliminate the gap between the pixel regions at least in the left-right direction of the liquid crystal element, the occurrence of dark lines caused by the gap between the pixel regions in the irradiation light to the front of the vehicle can be prevented, and the appearance of the light distribution pattern can be improved.

Here, the present invention is not limited to the contents of the above-described embodiment, and can be variously modified and implemented within the scope of the gist of the present invention. For example, in the above-described embodiment, a case where the boundaries between the pixel regions of the liquid crystal element are arranged vertically and horizontally has been illustrated, but the boundaries between the pixel regions may be arranged in an oblique direction. Further, the boundary is not limited to a straight line, but may be a curved line. Further, in the above-described embodiment, vertical alignment is exemplified as the alignment mode of the liquid crystal layer of the liquid crystal element, but the alignment mode is not limited thereto, and for example, a twist alignment mode may be used. Further, an optical compensator such as a C plate may be provided on one side or both sides of the liquid crystal element. Further, in the above-described embodiment, a liquid crystal element where each of the pixel regions are arranged along the two directions which are the vertical direction and the lateral direction (X and Y directions) has been illustrated, but the liquid crystal element may be configured to have each pixel region arranged along at least one direction (for example, X direction).

DESCRIPTION OF REFERENCE NUMERALS

1: Light source
2: Camera
3: Controller
4: Liquid crystal driving device
5: Liquid crystal element
6a, 6b: Polarizer
7: Projection lens
11: First substrate
12: Second substrate
13, 13a, 13b, 13c: First pixel electrode
14, 14a, 14b, 14c: Second pixel electrode
15: Insulation film
18: Common electrode
19: Liquid crystal layer
21, 21a, 21b, 21c: First wiring portion
22, 22a, 22b, 22c: Second wiring portion
23b, 23c: Inter-pixel electrode
24, 24a, 24b, 24c: Opening (Through hole)
51: First pixel region
52: Second pixel region

The invention claimed is:

1. A liquid crystal element comprising:
a first substrate;
a second substrate arranged to face the first substrate;
a first pixel electrode corresponding to a first pixel region arranged on the surface of the first substrate on the second substrate side;
a second pixel electrode corresponding to a second pixel region arranged on the surface of the first substrate on the second substrate side;
a common electrode arranged on the first substrate side of the second substrate;
a liquid crystal layer arranged between a group of the first pixel electrode and the second pixel electrode and the common electrode; and
a liquid crystal driving device which is electrically connected to the first pixel electrode, the second pixel electrode, and the common electrode, and applies a voltage between the first pixel electrode and the common electrode and between the second pixel electrode and the common electrode,
wherein the first pixel electrode and the second pixel electrode are provided on different layers on the first substrate, and their ends are arranged so as to partially overlap each other in a plan view,
wherein the first pixel electrode is arranged on the first substrate and closer to the first substrate than the second pixel electrode, and
wherein, when the first pixel region and the second pixel region are set to have a same gradation, the liquid crystal driving device sets a first voltage which is applied between the first pixel electrode and the common electrode to be higher than a second voltage which is applied between the second pixel electrode and the common electrode.

2. The liquid crystal element according to claim 1, further comprising:
an insulating film provided on the first substrate between the first pixel electrode and the second pixel electrode,
wherein a difference between the first voltage and the second voltage corresponds to a voltage divided by the insulating film when a voltage is applied from the first pixel electrode to the liquid crystal layer via the insulating film.

3. The liquid crystal element according to claim 2, further comprising:
a first wiring portion connected to the first pixel electrode; and
a second wiring portion connected to the second pixel electrode, wherein the first wiring portion and the second wiring portion are arranged on the first substrate closer to the first substrate side than the second pixel electrode via the insulating film, and wherein the second wiring portion is connected to the second pixel electrode via an opening provided in the insulating film.

4. A lighting apparatus capable of variably setting a light distribution pattern, the lighting apparatus comprising:
 a light source;
 a liquid crystal element which uses light from the light source to form an image corresponding to the light distribution pattern; and
 an optical system which projects the image formed by the liquid crystal element,
 wherein the liquid crystal element is the liquid crystal element according to claim 1.

5. The lighting apparatus according to claim 4, wherein, in the lighting apparatus, a plurality of first pixel regions and a plurality of second pixel regions of the liquid crystal element are arranged side by side in a left-right direction, and
 wherein the light distribution pattern has a variable contrast in the left-right direction.

6. A liquid crystal element having a plurality of first pixel regions and a plurality of second pixel regions and being statically driven, the liquid crystal element comprising:
 a first substrate;
 a second substrate disposed opposite to the first substrate;
 a plurality of first pixel electrodes arranged on the second substrate side surface of the first substrate and each corresponding to one of the plurality of first pixel regions;
 a plurality of second pixel electrodes arranged on the second substrate side surface of the first substrate and each corresponding to one of the plurality of second pixel regions;
 a plurality of first wiring portions arranged on the second substrate side surface of the first substrate and each being connected to one of the plurality of first pixel electrodes;
 a plurality of second wiring portions arranged on the second substrate side surface of the first substrate and each being connected to one of the plurality of second pixel electrodes;
 a common electrode disposed on the first substrate side of the second substrate; and
 a liquid crystal layer arranged between the plurality of first pixel electrodes, the plurality of second pixel electrode, and the common electrode,
 wherein the plurality of first pixel regions and the plurality of second pixel regions are arranged alternately in a first direction,
 wherein the plurality of first pixel regions are arranged adjacent to each other in a second direction intersecting the first direction, and the plurality of second pixel regions are arranged adjacent to each other in the second direction,
 wherein the plurality of first pixel electrodes and the plurality of second pixel electrodes are provided on different layers on the first substrate, and ends of adjacent ones of the first and second pixel electrodes in the first direction are disposed so that they partially overlap in a plan view,
 wherein the plurality of second pixel electrodes are arranged with a gap between adjacent ones of the second pixel electrodes in the second direction, wherein each of the plurality of second wiring portions has an inter-pixel electrode extending in the first direction, and wherein each of the inter-pixel electrodes is provided so as to overlap with one of the gaps in plan view.

7. The liquid crystal element according to claim 6, further comprising:
 an insulating film covering the plurality of first pixel electrodes and the plurality of second wiring portions,
 wherein the plurality of second pixel electrodes are provided above the insulating film, and
 wherein each of the plurality of second wiring portions is connected to one of the second pixel electrodes through an opening in the insulating film.

8. The liquid crystal element according to claim 7, further comprising:
 a liquid crystal driving device electrically connected to the plurality of first pixel electrodes, the plurality of second pixel electrodes, and the common electrode, the liquid crystal driving device applying a voltage between the plurality of first pixel electrodes and the common electrode and between the plurality of second pixel electrodes and the common electrode,
 wherein, when one of the first pixel regions and one of the second pixel regions are set to have a same gradation, the liquid crystal driving device sets a first voltage which is applied between the first pixel electrode and the common electrode to be higher than a second voltage which is applied between the second pixel electrode and the common electrode.

9. The liquid crystal element according to claim 8, wherein a difference between the first voltage and the second voltage is equivalent to a voltage divided by the insulating film when a voltage is applied to the liquid crystal layer from one of the plurality of first pixel electrodes via the insulating film.

10. The liquid crystal element according to claim 9, wherein the plurality of first wiring portions and the plurality of second wiring portions are arranged on the first substrate closer to the first substrate side than the plurality of second pixel electrodes with the insulating film interposed therebetween, and
 wherein each of the plurality of second wiring portions is connected to one of the plurality of second pixel electrodes through an opening provided in the insulating film.

11. A lighting apparatus capable of variably setting a light distribution pattern, the lighting apparatus comprising:
 a light source;
 a liquid crystal element which uses light from the light source to form an image corresponding to the light distribution pattern; and
 an optical system which projects the image formed by the liquid crystal element,
 wherein the liquid crystal element is the liquid crystal element according to claim 8.

12. The lighting apparatus according to claim 11, wherein, in the lighting apparatus, a plurality of first pixel regions and a plurality of second pixel regions of the liquid crystal element are arranged side by side in a left-right direction, and
 wherein the light distribution pattern has a variable contrast in the left-right direction.

* * * * *